United States Patent
Goblik et al.

[11] 3,806,609
[45] Apr. 23, 1974

[54] METHOD OF PRODUCING LIQUID SMOKE

[76] Inventors: Vasily Fedorovich Goblik, ul. Krasnoarmeiskaya, 41; Vasily Grigorievich Kotsur, ul. Dzerzhinskogo, 13, kv. 1; Vera Alexeevna Repnyakova, ul. Zavodskaya, 1, kv. 3; Lidia Mikhalovna Melnikova, ul. Krasnoarmeiskaya, 45, kv. 21; Ljudvig Iosifovich Kovach, ul. Pervomaiskaya 3, all of Perechin; Vasily Matveevich Gorbatov, Prospekt Mira, 74, kv. 70, Moscow; Valentina Pavlovna Volovinsky, ul. Akademika Pavlova, 40, kv. 7, Moscow; Nina Nikolevna Krylova, B. Chezdinsky per., 10, kv. 630, Moscow; Julia Nazarovna Lyaskovskaya, Tverskoi bulvar, 7/2, kv. 28, Moscow, all of U.S.S.R.

[22] Filed: Mar. 29, 1971

[21] Appl. No.: 128,847

Related U.S. Application Data

[63] Continuation-in-part of Ser. No. 37,393, May 11, 1970, abandoned, which is a continuation of Ser. No. 696,498, Jan. 9, 1968, abandoned.

[52] U.S. Cl................. 426/221, 426/492, 203/41, 203/47, 203/71, 203/96
[51] Int. Cl........................ A23b 1/04, B01d 15/02
[58] Field of Search............ 203/41, 71, 38, 61, 96, 203/47; 99/229, 140; 202/202; 55/59, 74; 201/29

[56] References Cited
UNITED STATES PATENTS

| | | | |
|---|---|---|---|
| 1,753,358 | 4/1930 | Wright.................... | 203/41 |
| 2,773,774 | 12/1956 | McCarthy et al.......... | 55/59 X |
| 3,106,473 | 10/1963 | Hollenback............... | 99/229 |
| 1,777,026 | 9/1930 | Alsberg................... | 99/140 |
| 3,663,237 | 5/1972 | Moller.................... | 99/229 |
| 3,615,729 | 10/1971 | Baker..................... | 99/229 |
| 2,095,857 | 10/1937 | Carter.................... | 203/41 |
| 511,288 | 12/1893 | Chase..................... | 99/229 |
| 3,360,444 | 12/1967 | Leibson et al............ | 203/41 |
| 1,661,403 | 3/1928 | Barnebey................. | 203/41 |

*Primary Examiner*—Wilbur L. Bascomb, Jr.
*Attorney, Agent, or Firm*—Waters, Roditi, Schwartz & Nissen

[57] ABSTRACT

A method of producing liquid smoke comprising the following steps:
  distillation of preneutralized aqueous smoke condensate with total acidity of 4.0–4.5% as calculated for acetic acid into two fractions at a boiling point of 98°–105°C;
  treatment of the first obtained fraction with adsorbents followed by desorption for the recovery of curing components adsorbed and mixing them with the second fraction, thus forming a mixture which is liquid smoke.

2 Claims, 1 Drawing Figure

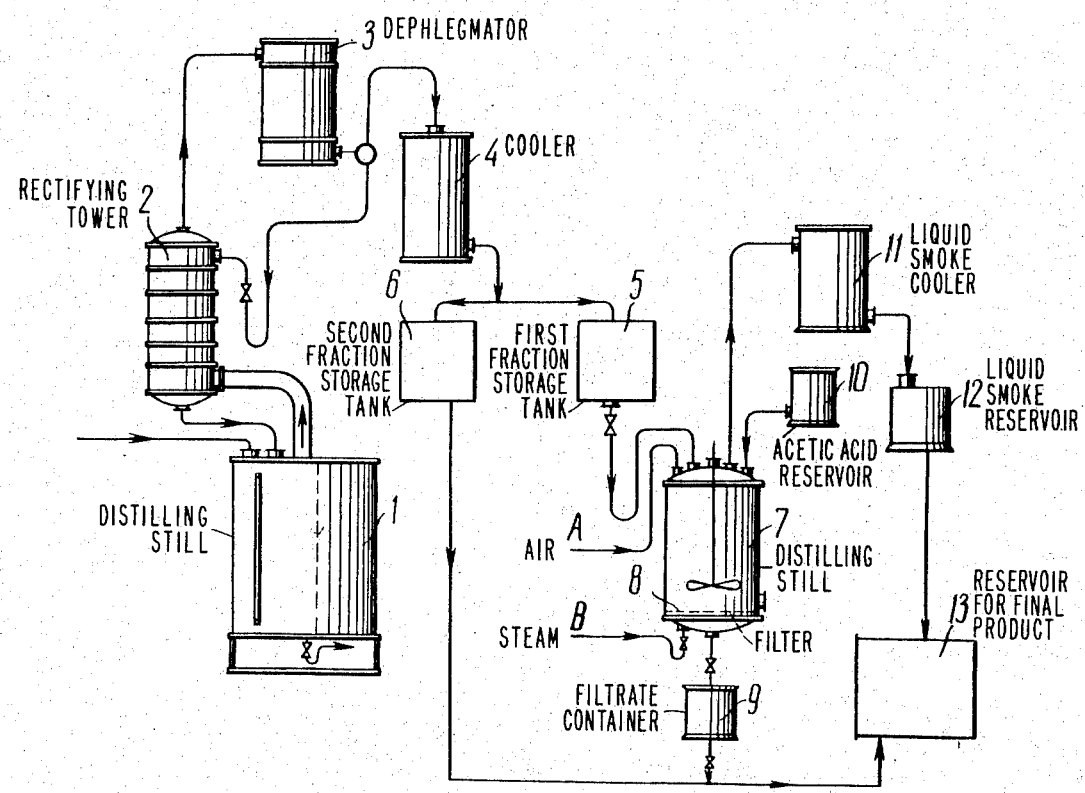

METHOD OF PRODUCING LIQUID SMOKE

The present invention is a continuation-in-part of application Ser. No. 37,393 filed May 11, 1970 (now abandoned) which in turn was a streamlined continuation application of Ser. No. 696,498 filed Jan. 9, 1968, and also now abandoned.

The present invention relates to smoke preparations for curing foodstuffs. More particularly, the invention relates to a method of producing liquid smoke.

The present invention can be used to advantage in the production of sausage products, however, it can be of equal use in the production of cream cheese.

There are known methods of producing liquid smoke comprising adsorption of an aqueous condensate of wood smoke by its filtration through a cellulose pulp, whereupon the obtained filtrate is utilized as liquid smoke. This liquid smoke comprises acetic acid in an amount of 3–6%, furfural which gives relish to smoked products, soluble tars in amounts of 3.5%, as well as negligible quantities of benzpyrene /see, e.g. U.S. Pat. No. 3,106,473 to Hollenbeck, Cl. 99–229/. A high acid content unfavorably on the quality of sausage products since it decreases the pH of the product and, hence, decreases its yield and adversely affects its consistency. Benzpyrene is unacceptable from a medical point of view. The soluble tars are non-volatile and, therefore, their presence is undesirable. They are ballast in liquid smoke and, besides, their great content decreases the percentage of the desirable substances.

An object of the present invention is to provide a method of producing liquid smoke which insures a complete absence of benzpyrene, and the presence of maximum purified curing components which impart specific smoked flavor to products.

The aforesaid object is accomplished by including the following steps, according to the invention, into a method of producing liquid smoke: distillation of a preneutralized aqueous smoke condensate with a total acidity of 4.0 – 4.5%, as calculated for acetic acid, into two fractions at a boiling point of 98° – 105°C., where the first fraction consists mainly of highly volatile compounds such as alcohols, esters, aldehydes and ketones and the second fraction of a group of acids and phenols having a higher boiling point; treating the first obtained fraction with adsorbents followed by desorption for the recovery of the adsorbed curing components, and mixing the obtained curing components with the second fraction to form liquid smoke.

The composition of liquid smoke obtained by the present method is as follows, in vol %:

| | |
|---|---|
| Phenols, as calculated for guaiacol | 0.10–0.20 |
| Carbonyl compounds, mmol per 100 ml | 4.0–6.5 |
| Esters | 0.15–0.20 |
| Total acidity, as calculated for acetic acid | 0.8–1.5 |
| Methanol, no more than | 0.15 |
| Soluble tars | 0.02 |

To gain a better insight into the present invention, there will be given a concrete example of the realization of the proposed method illustrated by the sole FIGURE in the appended drawing representing a diagrammatic illustration of a device for the realization of the method.

The proposed method comprises distilling two fractions from the aqueous smoke condensate, whereupon the first fraction is treated with adsorbents followed by desorption and then the desorbed substances are mixed with the second fraction to obtain a mixture which is used as liquid smoke.

The liquid is composed of carbonyl compounds in amounts of 4.0–6.5 mmol per 100 ml, 0.1–0.2 % of phenols, 0.8–0.5% of acids, no more than 0.15% of alcohols, 0.15–0.20% of esters and 0.02% of soluble tars.

The specified quantities of carbonyl compounds give a smoked flavor to a product. If these quantities are reduced, the liquid smoke will lack proper organoleptic properties and, if they are increased, the product will have too sharp a taste and aroma. The afore-specified acidity is the most favorable in preparing sausage products. An increase in the aforesaid phenol content adversely affects the organoleptic properties of meat products.

Liquid smoke is prepared as follows.

Smoke condensate, neutralized to 3–4.2 pH, is pumped into a distillating still 1. Products which are useful in preparing liquid smoke are distilled from the distillating still through rectifying tower 2, dephlegmator 3 and cooler 4.

Distillation starts at a temperature of 98°C and under atmospheric pressure. When distilling, the first fraction is taken at first which consists mainly of highly volatile compounds of a group of alcohols, esters, aldehydes and ketones. The quantity of the taken fraction amounts to from 15 to 20% of the total volume of the distilled liquid. The first fraction is collected in a storage tank 5. The second fraction which consists of compounds of a group of acids and phenols having a higher boiling point is collected in a storage tank 6 in amounts of 10–15% under the same conditions.

Four kg of activated charcoal as an absorbent per 100 liters of liquid is added into tank 5. Then, these substances are intensively mixed and kept for 1 hour with a periodic stirring. Then the adsorbent with adsorbed substances is transferred to a distillating still 7 where it is filtered through filter 8 either under vacuum or under a pressure of 0.5–1 atm. Pressurized air supply is conventionally shown by arrow A. In the course of filtration, undesirable substances are removed together with the filtrate, these being methanol, formaldehyde, acetone etc., which are collected in container 9, while carbonyl compounds are retained on the adsorbent.

Desorption of the adsorbates obtained by filtration is carried out in the presence of an acidic medium by means of live steam.

For this purpose, 4% acetic acid in an amount of 4 kg per kg of activated charcoal is charged into distilling still 7 from reservoir 10.

The contents of still 7 is heated to boiling and then live steam is supplied as shown by arrow B. As a result, intensive boiling takes place and adsorbates escape together with the steam and are then condensed in cooler 11 to form a solution of components of liquid smoke as a vapor fraction. This fraction is collected in reservoir 12 and its quantity amounts to 250% by volume of the acetic acid added.

The vapor fraction is pumped from reservoir 12 into reservoir 13 whereinto the second fraction from collector 6 is supplied, the liquids are mixed in reservoir 13 and liquid smoke is thus obtained.

The mixed liquids are taken in a ratio of 1:1.
The composition of the obtained liquid smoke, is:

| | |
|---|---|
| Phenols | 0.1–0.2% |
| Carbonyl compounds, mmol per 100 ml | 4.0–6.5 |
| Acids | 0.8–1.5% |
| Esters | 0.15–0.20% |
| Soluble tars | 0.02% |

This liquid is purified from foreign and harmful substances and does not contain benzpyrene. It incorporates sufficient quantities of substances which impart to foodstuffs a smoked taste and aroma.

In the above, the initial material used according to the present method of producing liquid smoke is a wood smoke condensate obtained by the pyrolysis of hard wood varieties with a limited amount of air. This condensate is an aqueous solution of a steam-and-gas mixture (smoke) produced by common methods. The term "liquid smoke" is used to describe the final product obtained as a result of all the steps carried out in accordance with the present method. The final liquid smoke is used for treating food products (sausage products) in place of smoke.

What we claim is:

1. A method of producing liquid smoke comprising the following steps:

distilling a wood smoke condensate obtained by the pyrolysis of hard wood varieties with a limited amount of air and having a total acidity of 4.0 to 4.5 per cent as calculated for acetic acid, and being neutralized to a pH of 3 to 4.2 into first and second fractions;

collecting the first fraction, which consists essentially of highly volatile substances selected from the group consisting of alcohols, esters, aldehydes and ketones, at a temperature of 98°C;

collecting the second fraction consisting of substances selected from the group consisting of acids and phenols having a higher boiling point, at a temperature not exceeding 105°C;

treating the first fraction with adsorbents for the adsorption of curing components;

separating impurities by filtration;

treating the filtered adsorbent, with adsorbed curing components, with acetic acid;

desorbing with live steam the adsorbed curing components from the acidic medium; and mixing the curing components with the second fraction in a ratio of 1:1 to form a mixture which is a liquid smoke.

2. The liquid smoke product produced by the method of claim 1 consisting essentially of an aqueous solution of the following substances given in vol.%:

| | |
|---|---|
| Phenols, as calculated for guaiacol | 0.10 to 0.20 |
| Carbonyl compounds, mmol per 100 ml. | 4.0 to 6.5 |
| Esters | 0.15 to 0.20 |
| Acids, as calculated for acetic acid | 0.8 to 1.50 |
| Methanol, not more than | 0.15 |
| Soluble tars | 0.02. |

* * * * *